United States Patent Office 3,592,853
Patented July 13, 1971

3,592,853
PROCESS FOR MANUFACTURE OF AMINES
George Barsky, New York, N.Y., assignor to Wilson Pharmaceutical & Chemical Corporation
No Drawing. Continuation-in-part of abandoned application Ser. No. 426,672, Jan. 19, 1965. This application Apr. 29, 1968, Ser. No. 725,215
Int. Cl. C07c 85/00, 95/00, 99/00
U.S. Cl. 260—583R                 9 Claims

ABSTRACT OF THE DISCLOSURE

The process of this invention deals with the manufacture of aliphatic amino compounds formed by the splitting of mono-unsaturated long chain acids, etc., with hydrazoic acid. When an aliphatic monocarboxylic acid, such as oleic acid, is reacted with hydrazoic acid in the presence of a strong mineral acid at a temperature up to 45° C., the carboxyl group is converted to an amine group and a second molecule of hydrazoic acid reacts with the double bond to split the aliphatic group into fragments, one product of which may be, if the starting material were oleic acid, an octyl diamine.

This application is a continuation-in-part of my U.S. application Ser. No. 426,672, filed Jan. 19, 1965, entitled: Process for Manufacture of Amino Compounds, now abandoned.

This invention relates to amine compounds. More particularly, it relates to the production of primary amines of normal alkyl groups containing more than 6 carbon atoms in a straight chain and in which the amine group is attached to a terminal carbon atom. Still more particularly, it relates to a method of production of primary alkylene amines and straight chain amino aldehydes having the amino group attached to a terminal carbon atom.

Briefly, the process of the present invention comprises the steps of reacting mono-unsaturated compounds with hydrazoic acid in the presence of a strong mineral acid to produce straight chain saturated compounds of 6 to 13 carbon atoms having a primary amino group attached to at least one of the terminal carbon atoms.

One of the most important uses for compounds such as di-amines and amino acids is in the production of nylon type of polymers, usually termed polyamides. Polyamides are fabricated into many useful forms such as fibers, films and molded articles. The common types of nylon are the nylon 6 and nylon 66. Raw materials for the former is E-caprolactam, or E-amino caproic acid; for the latter adipic acid and hexamethylene di-amine. Nylons of longer chain amino acids or longer chain di-amines are known. These have somewhat different properties from nylon 6 and 66 and are preferred for some uses. However, because of the difficulty in making the required amino raw materials, these alternate nylons have made only slow commercial progress.

One method of producing starting materials for production of polyamides is the reaction of oleic acid with ozone to produce pelargonic and azelaic acids. Azelaic acid can then be converted by treatment with ammonia to the di-nitrile which in turn may be hydrogenated to the corresponding di-amine.

A proposed method of converting an additional product of the reaction of oleic acid with ozone to a useful starting material for production of polyamides is the catalytic treatment of the azelaic half aldehyde produced in the ozone reaction, with ammonia and hydrogen to produce amino-nonanoic acid. Another suggested method for converting this product of the ozone reaction to an amino acid is to treat the azelaic half aldehyde with hydroxylamine and to hydrogenate the resulting oxime to aminononanoic acid. While these processes are feasible, the use of these diamines and amino acids in manufacture of such products as "nylon" resins has been restricted by production costs.

Now it has been discovered that the unsaturated linkage of mono-unsaturated compounds having 10 to 22 carbon atoms, said unsaturated bond being at a point terminating an alkane group of at least 6 carbons in a straight chain, i.e., at an interior position connected only to secondary carbon atoms, selected from the group consisting of fatty acids, fatty nitrile, fatty primary amine and fatty acid esters of lower alkyl alcohols can be broken by reaction with hydrazoic acid, $HN_3$, in the presence of strong mineral acid, to produce straight chain saturated compounds having the formula:

$$H_2N(CH_2)_mY$$

wherein $m$ is an integer from 6 to 12 and Y is a member of the group consisting of $-NH_2$, $-CHO$, $-CN$ and

and where R is a member of the group consisting of lower alkyl radicals having 1 to 6 carbon atoms.

The process involves the reaction of a mono-unsaturated fatty acid, fatty acid ester, fatty nitrile, fatty amine and other mono-unsaturated fatty compound in which the group standing in place of the carboxylic group of the fatty acid is non-reactive in acid media, with hydrazoic acid, $HN_3$. Typical mono-unsaturated compounds which can be split to form useful amino compounds are unsaturated acids such as lauroleic acid, myristoleic acid, ricinoleic acid, oleic acid, petroselic acid, erucic acid, etc.; fatty acid esters such as methyl oleate, ethyl oleate, propyl ricinoleate, hexyl myristoleate, etc.; fatty nitrile such as oleonitrile, myristoleonitrile, etc., fatty primary amines such as oleylamine, erucylamine, palmitoleyl amine, etc.

When such a mono-unsaturated fatty compound having in excess of 10 carbon atoms in the aliphatic group is reacted with hydrazoic acid in the presence of strong mineral acid, a splitting or fission occurs at the double bond with the result that the alkylene group is split into two alkyl fragments. The terminal carbons of the two fragments which previously had been adjacent carbons connected by the double bond, have attached thereto either an aldehyde group or an amino group. The reaction gives rise to two sets of products as is illustrated by the following equation:

$$RCH=CHR' - A + HN_3 + H_2O \rightarrow$$

(1) $RCHO + NH_2CH_2R' - A + N_2$ and (2) $RCH_2NH_2 + OHCR' - A + N_2$

In the above formula, A designates a member of the group consisting of $NH_2$, CN, COOH and COOR'' wherein R'' is a member of the group consisting of lower alkyls having 1 to 6 carbon atoms.

The reaction gives rise to products in which either of the fragments may appear as an amine. However, all the products are more valuable than the original raw material. For example, the aldehydic groups may be reduced to hydroxyl to give useful alcohols or oxidized to carboxyl or converted to amino groups.

When the fatty acid itself is used as a starting material, a reaction also occurs at the carboxyl group to form an amino group with splitting out of $CO_2$ as hereinafter described in an example.

The process requires for reaction a strongly acidic medium. Suitable acids are sulfuric acid, nitric acid, phosphoric acid, and the like.

The instant reaction requires the presence of hydrazoic acid. This reactant can be added to the solution of mono-unsaturated compound to be fragmented or in view of the strongly acidic reaction conditions, the hydrazoic acid may be formed in situ by reaction of mineral acid with hydrazoic acid precursors such as sodium azide.

Control of temperature of the reaction mixture is necessary to insure amination. If the temperature is too low, the reaction is unduly slow and if too high, the utilization of hydrazoic acid is poor. Accordingly, the temperature of the reaction mixture is maintained in the range between about 10° C. and 45° C.

In the preferred embodiment of the invention, diamine reaction products are produced by splitting the mono-unsaturated fatty acids of 10 to 22 carbon atoms. The common commercially available mono-unsaturated acids of this group are oleic acid (9-octadecenoic acid) and erucic acid (13-docesenoic acid). Splitting of these particular acids produces directly, 1,8-diamino octane and 1,12-diamino dodecane, respectively, and corresponding aldehyde-amino compounds convertible to diamino compounds or compounds having amino and carboxylic groups attached to the terminal carbons of the hydrocarbon chain.

The invention is illustrated by the following examples which are given by way of illustration and are not to be construed as limitations upon the invention.

EXAMPLE I

In this example, oleonitrile is split by means of hydrazoic acid in accordance with the following equations:

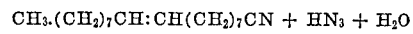

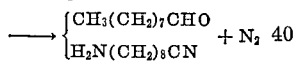

and

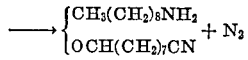

26 parts of oleonitrile are dissolved in 500 parts of cyclohexane, 20 parts of 98% $H_3PO_4$ are added to the cyclohexane solution slowly. Five parts of hydrazoic acid dissolved in 100 parts of cyclohexane are then added slowly with vigorous agitation and with cooling to keep the temperature below 40° C. After the reaction has ceased as evidenced by the end of evolution of gas, four hundred parts of water are added, and the supernatent cyclohexane liquid separated. The aqueous layer is mixed with an additional portion of cyclohexane, and the layers again separated. The two portions of cyclohexane are combined.

The aqueous layer is made quite alkaline with caustic soda to precipitate out a mixture of amine and amino-nitrile which is drawn off. The mixture is subjected to fractional distillation in vacuum to separate the amine from the amino-nitrile. The amino-nitrile may be hydrolyzed by means of alkali or acid to the corresponding amino acid. The amino-nitrile can be hydrogenated to the di-amine. In this case the di-amine is essentially nonamethylene di-amine.

The combined cyclohexane solution is refined as in the refining of vegetable oils by treating with about 20% caustic soda in slight excess over the amount required by analysis to neutralize all the free acid present. This "soap" stock is removed and the cyclohexane washed with water. The cyclohexane layer is distilled first to remove the hydrocarbon, then under vacuum to remove aldehydes and then to recover the aldehyde-nitrile. The aldehyde-nitrile may be treated by oxidizing with air and then reducing the amino-acid. Alternately, it may be treated with hydroxylamine and reduced catalytically with hydrogen to the di-amine which is separated finally by distillation. The compounds obtained all contain nine carbon atoms in the chain.

EXAMPLE II

In this example, the same procedure as in Example I is applied for the reaction of methyl oleate with hydrazoic acid. In this case, the aqueous layer contains an amine and an amino-ester. The amine is separated by making the solution alkaline with caustic soda and boiling to saponify the ester. The amine separates as an oil, the amino-acid remaining in solution as the alkali salt. After the oil has been removed, the solution is brought to neutrality with acid and the amino-acid crystallized or extracted by means of cyclohexane or other volatile solvent.

In the above procedure, some hydrolysis of the methyl oleate may occur in the first reaction and, therefore, a small amount of $C_8$ diamine is formed as is described in Example III.

The cyclohexane solution separated from the original reaction mixture to which water has been added is heated to remove the hydrocarbon and then treated by the commercial process to recover pelargonic and azelaic acids.

EXAMPLE III

In this example, one molecule of hydrazoic acid converts the oleic acid to an amine by the following reaction:

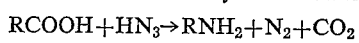

A second molecule of hydrazoic reacts with the double bond to split it into an aldehyde and an amino group. Thus, we can can obtain a diamine directly. This diamine contains eight carbon atoms.

Sodium azide is prepared by the method of Naegeli and Vogt-Markus (helvetica Chemica Acta, vol. 12, p. 64). The sodium azide so formed is filtered from the alcohol and dried in a current of air. It is analyzed by the method of the above reference. An amount equivalent to 26 parts of $Na\ N_3$ is used in the procedure described below.

50 parts of oleic acid are dissolved in 500 parts of benzene 100 parts of 98% phosphoric acid are then added slowly and with vigorous agitation, the temperature being kept at 40° C., 26 parts of $Na\ N_3$ are added in small portions at a time. After reaction has ceased, 100 parts of water are added slowly. The mixture is boiled under reflux and then cooled.

The hydrocarbon layer is separated and refined as in Example I. It contains aldehydes which are recovered by distillation.

The aqueous layer is made alkaline with caustic soda and blown with oxygen at 90° C. It is then cooled and the insoluble layer removed. The resulting solution contains the mono- and di-amines which are separated by distillation. The aqueous layer remaining is carefully brought to neutrality and cooled to crystallize out the amino acid.

I prefer that the unsaturated raw material be relatively free from saturated acids, saturated nitriles or saturated esters as these burden the process and in some cases use up the hydrazoic acid reagent. However, it is not necessary that the raw materials be entirely free of such compounds which may be introduced with the oleic compound used.

I also prefer that the unsaturated raw material be free from compounds containing more than one double bond. While the process will work in the presence of polyunsaturated compounds, their presence increases the steps necessary to prepare pure compounds and in addition consumes hydrazoic acid.

The temperature at which the reaction of the oleyl compound and hydrazoic acid takes place should be kept under control, otherwise reduction occurs to the stearyl compound. I prefer to add the hydrazoic acid or sodium azide to the oleyl compound rather than the other way around, for the same reason as this avoids the presence of excess hydrazoic acid at all times. Agitation is also important.

Sodium azide and hydrazoic acid are potentially relatively cheap reagents. Sodium azide may be made by treating sodamide with nitrous oxide. Sodamide is made from metallic sodium and ammonia. The third reagent, nitrous oxide, is made from ammonium nitrate. All these raw materials are cheap and the processing relatively simple. Thus, on a reasonably large scale, the cost of sodium azide is not excessive.

While a detailed description of the process has been provided, together with discussion of some possible modifications, it should be understood that numerous revisions and modifications may be effected without departing from the true scope and spirit of the novel concepts of this invention as indicated in the appended claims.

I claim:

1. A process for producing and recovering straight chain saturated alkane amines comprising reacting hydrazoic acid in the presence of a strong mineral acid at a temperature in the range between about 10° C. and 45° C. with an organic compound of 10 to 22 carbon atoms having the formula

R—CH=CHR'—A wherein A is a member of the group consisting of NH$_2$, CN, COOH and COOR", R is an alkyl radical having 6 to 12 carbon atoms, R' is an alkylene radical and R" is a lower alkyl having 1 to 6 carbon atoms, whereby the ethylenic linkage is split and the terminal carbons attached thereto have a radical selected from the group consisting of amine and aldehyde radicals and recovering at least one alkane amine from the mixture of reaction products.

2. A process according to claim 1 wherein said mono-unsaturated compound is present as solute in a hydrocarbon solvent.

3. A process according to claim 1 wherein the hydrazoic acid is formed in situ by reaction of mineral acid and sodium azide.

4. A process according to claim 1 wherein said mono-unsaturated compound is a mono-unsaturated fatty acid and the product recovered is an alkyl diamine.

5. A process according to claim 1 wherein said mono-unsaturated compound is oleic acid and the product recovered is 1,8 octyl diamine.

6. The process according to claim 1 wherein said unsaturated compound is a fatty primary amine of more than 12 carbon atoms and the product recovered is a straight chain saturated diamine of 6 to 12 carbon atoms.

7. The process according to claim 1 wherein the recovered product is an alkyl monoamine.

8. The process according to claim 1 wherein the mono-unsaturated compound is oleic acid and the recovered amine products are octyl diamine and 1 amino nonane.

9. The process according to claim 1 wherein the mono unsaturated compound is oleyl nitrile and the recovered amine product is amino nonane.

References Cited

Kuhn et al., Journal of the American Chemical Society, vol. 72 (1950), pages 5777 and 5778.

Dittmer et al., Journal of Organic Chemistry, vol. 24 (1959), pages 651 to 653.

Smith, Open-Chain Nitrogen Compounds, W. A. Benjamin, Inc. N.Y., 1965, pages 71 and 72.

CHARLES B. PARKER, Primary Examiner

R. L. RAYMOND, Assistant Examiner

U.S. Cl. X.R.

260—404, 405, 465.1, 465.5, 482, 483, 526, 534, 583P, 584A, 604